United States Patent
Daughenbaugh et al.

(10) Patent No.: US 11,374,223 B2
(45) Date of Patent: Jun. 28, 2022

(54) SLURRY COMPOSITION INCLUDING BINDER CONTAINING REACTION PRODUCT OF EPOXY FUNCTIONAL POLYMER AND ACID FUNCTIONAL POLYMER FOR LITHIUM ION ELECTRICAL STORAGE DEVICES

(71) Applicant: PPG INDUSTRIES OHIO, INC., Cleveland, OH (US)

(72) Inventors: Randy E. Daughenbaugh, Monroeville, PA (US); Shanti Swarup, Allison Park, PA (US); Stuart Hellring, Pittsburgh, PA (US); Anthony Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 57 days.

(21) Appl. No.: 15/638,448

(22) Filed: Jun. 30, 2017

(65) Prior Publication Data
US 2019/0006676 A1    Jan. 3, 2019

(51) Int. Cl.
| | |
|---|---|
| *H01M 4/62* | (2006.01) |
| *H01M 4/131* | (2010.01) |
| *H01M 10/0525* | (2010.01) |
| *H01M 4/38* | (2006.01) |
| *H01M 4/583* | (2010.01) |

(52) U.S. Cl.
CPC ........... *H01M 4/622* (2013.01); *H01M 4/131* (2013.01); *H01M 10/0525* (2013.01); *H01M 4/382* (2013.01); *H01M 4/583* (2013.01)

(58) Field of Classification Search
CPC .......................... H01M 4/622; H01M 10/0525
USPC ........................................................ 429/214
See application file for complete search history.

(56) References Cited

U.S. PATENT DOCUMENTS

| | | | |
|---|---|---|---|
| 9,520,591 B2 | 12/2016 | Daughenbaugh et al. | |
| 2004/0005501 A1* | 1/2004 | Nakai | H01M 4/1391 429/232 |
| 2012/0095131 A1* | 4/2012 | Kinoshita | H01M 10/0525 523/410 |
| 2013/0034651 A1 | 2/2013 | Buqa et al. | |
| 2013/0330622 A1* | 12/2013 | Sasaki | H01M 4/134 429/217 |
| 2014/0144778 A1 | 5/2014 | Daughenbaugh et al. | |
| 2015/0243994 A1* | 8/2015 | Chu | C09J 105/00 429/217 |
| 2016/0028087 A1* | 1/2016 | Sonobe | H01M 4/622 429/217 |
| 2016/0118664 A1* | 4/2016 | Sonobe | H01M 4/62 429/217 |
| 2016/0204439 A1* | 7/2016 | Sonobe | H01M 4/622 429/217 |

FOREIGN PATENT DOCUMENTS

| | | | | | |
|---|---|---|---|---|---|
| CN | 106207190 A | * | 12/2016 | | |
| JP | 11167921 A | * | 6/1999 | | |
| JP | 2003157851 A | * | 5/2003 | | |
| JP | 2011134618 A | * | 7/2011 | | |
| JP | 2012146477 | | 8/2012 | | |
| JP | 2013098123 | | 5/2013 | | |
| JP | 2015088486 | | 5/2015 | | |
| KR | 20160046882 | | 4/2016 | | |
| WO | 2012/043729 | | 4/2012 | | |
| WO | WO-2012115096 A1 | * | 8/2012 | ............ | H01M 4/134 |
| WO | 2012133031 | | 10/2012 | | |
| WO | 2015/045350 | | 4/2015 | | |

* cited by examiner

*Primary Examiner* — Sean P Cullen
(74) *Attorney, Agent, or Firm* — Ashley N. Crane

(57) ABSTRACT

The present invention is directed to a lithium ion battery electrode slurry composition comprising: (a) an electrochemically active material capable of lithium intercalation and deintercalation; (b) a binder dispersed in an aqueous or organic medium and comprising a reaction product of a reaction mixture comprising one or more epoxy functional polymer(s) and one or more acid functional acrylic polymer(s); and (c) an electrically conductive agent. The present invention also provides an electrode comprising: (a) an electrical current collector; and (b) a cured film formed on the electrical current collector. The cured film is deposited from the slurry composition described above. Electrical storage devices prepared from the electrode are also provided.

20 Claims, No Drawings

SLURRY COMPOSITION INCLUDING BINDER CONTAINING REACTION PRODUCT OF EPOXY FUNCTIONAL POLYMER AND ACID FUNCTIONAL POLYMER FOR LITHIUM ION ELECTRICAL STORAGE DEVICES

FIELD OF THE INVENTION

The present invention relates to electrode slurry compositions that contain a binder, which in turn comprises a reaction product of a reaction mixture comprising one or more epoxy functional polymer(s) and one or more acid functional acrylic polymer(s). The slurry compositions are useful in the manufacturing of electrodes for use in electrical storage devices such as batteries. The present invention also relates to electrodes comprising a cured film prepared from the slurry compositions, and to electrical storage devices.

BACKGROUND OF THE INVENTION

Electrodes for electrochemical cells are usually manufactured by attaching an electrochemically active electrode material such as a lithium compound to a current collector. Conventional current collectors may be rigid supports or flexible foils made from an electrically conductive material such as copper or aluminum. The electrochemically active electrode material may be prepared as a slurry or paste and subsequently coated onto the current collector. Alternatively, the slurry is manufactured as a self-supporting layer which is later attached to the current collector. Methods of attaching the electrochemically active electrode material to the current collector may include lamination, gluing with adhesives, or coating.

The slurry or paste usually comprises a mixture of an electrochemically active material and a binder material. Further components such as conductive additives (i.e. carbon black, graphite, graphene, carbon fibers, VGCF (vapor grown carbon fibers, etc.) are also often included in the slurry.

Polyvinylidene fluoride (PVDF) or polyvinylidene fluoride-hexafluoropropylene (PVDF-HFP) copolymers have demonstrated excellent chemical and mechanical properties when used as a binder material in a slurry for positive and negative electrodes. In particular, PVDF provides a good electrochemical stability and high adhesion to the electrode materials and to current collectors, making it a preferred binder material for electrode slurries. Typically, the polyvinylidene is dissolved in an organic solvent and then the electrode material, such as an electrochemically active lithium compound and a carbonaceous material, is combined with the PVDF solution to form a slurry that is applied to a metal foil or mesh to form the electrode.

The role of the organic solvent is to dissolve PVDF in order to provide good adhesion between the electrode material particles and the metal foil or mesh upon evaporation of the organic solvent. Unfortunately, there is only a small number of solvents in which PVDF is soluble. Currently, the organic solvent of choice is N-methyl-2-pyrrolidone (NMP). PVDF binders dissolved in NMP provide superior adhesion and an interconnectivity of all the active ingredients in the electrode slurry composition. The bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move across the electrode, and lithium ion mobility requires interconnectivity within the electrode between particles.

However, NMP is a toxic material and presents health and environmental issues. NMP is on the list of Chemicals Known to the State to Cause Cancer or Reproductive Toxicity cited in California Proposition 65 (1986). In the face of increasing regulation, some manufacturers are considering alternative solvents for some applications, especially where worker exposure is difficult to control. It would therefore be desirable to develop electrode slurries that use binders other than PVDF, eliminating the need for NMP, and that provide acceptable performance, adhesive and chemical resistance properties.

The present invention thus aims to provide electrode slurry compositions useful for the manufacture of electrodes for use in electrical storage devices such as batteries, which overcome or alleviate at least some of the afore-mentioned deficiencies of currently available conventional electrode slurry compositions. The present invention therefore is in particular directed towards providing environmentally friendly electrode slurry composition without adverse health effects, which exhibit comparable or even better electrochemical performance, adhesive and chemical resistance properties compared to conventional electrode slurry compositions that use a polyvinylidene fluoride polymer as binder.

SUMMARY OF THE INVENTION

The present invention provides a lithium ion battery electrode slurry composition comprising:
  (a) an electrochemically active material capable of lithium intercalation and deintercalation;
  (b) a binder dispersed in an aqueous or organic medium and comprising a reaction product of a reaction mixture comprising one or more epoxy functional polymer(s) and one or more acid functional acrylic polymer(s); and
  (c) an electrically conductive agent.

The present invention also provides an electrode comprising:
  (a) an electrical current collector; and
  (b) a cured film formed on the electrical current collector, wherein the cured film is deposited from the slurry composition described above and in more detail below.

The present invention furthermore relates to an electrical storage device, such as a battery, comprising:
  (a) an electrode as described above and in more detail below,
  (b) a counter electrode, and
  (c) an electrolyte.

DETAILED DESCRIPTION OF THE INVENTION

The present disclosure provides a slurry composition useful in the manufacture of an electrode for an electrochemical cell. In particular, the present invention is directed to a slurry composition comprising: (a) an electrochemically active material capable of lithium intercalation and deintercalation; (b) a binder dispersed in an aqueous or organic medium and comprising a reaction product of a reaction mixture comprising one or more epoxy functional polymer(s) and one or more acid functional acrylic polymer(s); and (c) an electrically conductive agent. The electrode slurry can be used to prepare an electrode for a lithium ion electrical storage device such as a battery.

The electrochemically active material (a) in the electrode slurry can be selected according to the type of electrical storage device of interest. For example, for the preparation of positive electrodes, the electrically active material (a) typically comprises electrochemically active lithium compounds capable of lithium intercalation and deintercalation. Examples include lithium-containing oxides and phosphates such as $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$ or mixtures or combinations of any of the foregoing. For the preparation of negative electrodes, the electrically active material (a) may comprise graphite, silicon, including silicon compounds such as silicon oxides, tin, including tin compounds and alloys, or a mixture or combination of any of the foregoing. The electrochemically active material (a) can be present in the slurry in amounts of at least 45 percent by weight, such as at least 50 percent by weight, or at least 70 percent by weight, based on the total weight of solids in the slurry. The electrochemically active material (a) can for example be present in the slurry in in amounts of up to 98 percent by weight, such as up to 95 percent by weight, or up to 80 percent by weight, based on the total weight of solids in the slurry.

The binder (b) may be dispersed in an aqueous or organic medium and comprises a reaction product of a reaction mixture comprising one or more epoxy functional polymer(s) and one or more acid functional acrylic polymer(s). As used herein, an "aqueous medium" refers to a liquid medium comprising at least 50 weight % water, based on the total weight of the liquid medium. Such aqueous liquid mediums can for example comprise at least 60 weight % water, or at least 70 weight % water, or at least 80 weight % water, or at least 90 weight % water, or at least 95% water, based on the total weight of the liquid medium. The aqueous medium may optionally further comprise one or more organic solvents. Non-limiting examples of suitable organic solvents for use in the aqueous medium or as an organic medium include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

The binder (b) and the slurry are usually essentially free of N-Methyl-2-pyrrolidone. By "essentially free" is meant that if a compound is present in a composition, it is present incidentally in an amount of less than 0.1 percent by weight, often less than 0.05 percent by weight or less than 0.01 percent by weight, usually less than trace amounts. The compound is therefore generally not present in an amount sufficient to affect any properties of the composition.

The binder (b) can in principle comprise any reaction product of a reaction mixture comprising one or more epoxy functional polymer(s) and one or more acid functional acrylic polymer(s). The reaction product may comprise one or more polymers having epoxy, hydroxyl, and/or acid functionality. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C. The term "acrylic polymer" as used herein relates to addition polymers derived from one or more acrylic monomer(s), i.e. acrylic acid, methacrylic acid (referred to together also as (meth)acrylic acid) and/or alkyl esters of (meth)acrylic acid, optionally with one or more other polymerizable ethylenically unsaturated monomer(s).

Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include for example vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The binder (b) is often prepared by chain extending one or more non-epoxy functional acrylic polymer(s), prepared using any known method, with one or more epoxy-functional chain extending agent(s). In particular, the binder can be prepared by chain extending one or more acid-functional acrylic polymer(s) with one or more epoxy-functional material(s) that contain functional groups, which are reactive with the acid functionality of the acrylic polymer. The binder is often prepared from a mixture of polymers comprising one or more epoxy functional polymer(s) and one or more acid functional acrylic polymer(s).

Suitable epoxy functional polymers (which can be used together with one or more acid functional acrylic polymers for preparing the binder (b)) may be prepared by reacting together a polyepoxide and (i) a polyamine group-containing material and/or (ii) a polyhydroxyl group-containing material selected from alcoholic hydroxyl group-containing materials and phenolic hydroxyl group-containing materials. The polyepoxide may also be reacted with a material containing both hydroxyl and amine groups.

The polyepoxide and a polyhydroxyl group-containing material may be reacted together neat or in the presence of an inert organic solvent such as a ketone, including methyl isobutyl ketone and methyl amyl ketone, aromatics such as toluene and xylene, and glycol ethers such as the ethyl ether of diethylene glycol. The reaction is usually conducted at a temperature of about 80° C. to 160° C. for about 30 to 180 minutes until an epoxy group-containing resinous reaction product is obtained.

The polyepoxide by definition has at least two 1,2-epoxy groups. In general the calculated epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic.

Examples of polyepoxides are those having a 1,2-epoxy functionality greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl) propane, 2,2-bis(4-hydroxy-3-tertiarybutylcyclohexyl)propane, 1,3-bis(hydroxymethyl)cyclohexane and 1,2-bis (hydroxymethyl)cyclohexane. Examples of aliphatic polyols include, inter alia, trimethylpentanediol and neopentyl glycol. A particularly suitable polyepoxide used to prepare the epoxy functional polymer is EPON 828, available from Momentive Performance Materials Inc.

Polyhydroxyl group-containing materials used to react with the polyepoxide to form the epoxy functional polymer may be any of the cyclic polyols, cycloaliphatc polyols, or aliphatic polyols listed above. Polyhydroxyl group-containing materials used to react with the polyepoxide may additionally be polymeric polyols. The equivalent ratio of reactants; i. e., the ratio of epoxy:hydroxyl groups, is typically from about 1.00:0.10 to 1.00:0.80.

Polyamine group-containing materials used to react with the polyepoxide to form the epoxy functional polymer may be primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Examples of suitable aliphatic diamines include, without limitation, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotolylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof. Cycloaliphatic diamines are available commercially from Huntsman Corporation (Houston, Tex.) under the designation of JEFFLINK™ such as JEFFLINK™ 754. Additional aliphatic cyclic polyamines may also be used, such as DESMOPHEN NH 1520 available from Bayer Material Science and/or CLEARLINK 1000, which is a secondary aliphatic diamine available from Dorf Ketal. POLYCLEAR 136 (available from BASF/Hansen Group LLC), the reaction product of isophorone diamine and acrylonitrile, is also suitable. Other exemplary suitable polyamines are described in U.S. Pat. No. 4,046,729 at column 6, line 61 to column 7, line 26, and in U.S. Pat. No. 3,799,854 at column 3, lines 13 to 50, the cited portions of which are incorporated by reference herein. Additional polyamines may also be used, such as ANCAMINE polyamines, available from Air Products and Chemicals, Inc.

Suitable materials containing both hydroxyl and amine groups include hydroxyalkylamines such as hydroxyethylamine and the like.

The epoxy functional polymer usually has an epoxy equivalent weight of at least 3500 or at least 5500. Typically the epoxy functional polymer has an epoxy equivalent weight of up to 11000. The epoxy equivalent weight may for example be in a range from 3500-11000, or 5500-6500, or 9000-11000. The epoxy equivalent weight can be measured using titration with 0.1 N perchloric acid according to ASTM D1652 (published in ASTM Volume 06.03).

Suitable acid functional acrylic polymers useful to react with the epoxy functional polymer(s) as described above to prepare the binder (b) of the slurry compositions according to the present invention include copolymers of one or more alkyl esters of acrylic acid or methacrylic acid, together with at least one acid functional ethylenically unsaturated monomer and optionally one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acid functional acrylic polymer includes acid functional groups, which are often incorporated into the polymer by including one or more acid functional monomers in the reactants used to produce the copolymer. Useful ethylenically unsaturated acid functional monomers used to prepare the acid functional acrylic polymer include for example monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate.

The acid functional acrylic polymer usually has a calculated (theoretical) acid value in the range of 20-150. It may also be measured using a titration method with 0.1 N KOH.

To prepare the binder (b), the epoxy functional polymer and acid functional acrylic polymer may be mixed together and heated to a temperature of 50 to 150° C. in order to chain extend or build the molecular weight of the polymer. The reaction product may comprise one or more polymers having epoxy, hydroxyl, and/or acid functional groups, which may be influenced by the stoichiometry of the reactants. Acid and hydroxyl functional groups are useful in the preparation of aqueous dispersions. Excess acid functional groups may be neutralized with an amine such as dimethylethanolamine to facilitate dispersion in water. For dispersions in organic media, up to ten percent of the functional groups in the binder (b) may be epoxy functional. In certain examples of the present invention, the mixture of polymers used to prepare the binder (b) of the slurry composition of the present invention comprises at least 70 percent by weight of one or more epoxy functional polymer(s) and up to 30 percent by weight of one or more acid functional acrylic polymer(s), wherein the percentages by weight are based on the total weight of the reaction product in the binder (b).

The binder (b) may further comprise a crosslinking agent, such as an aminoplast, a polycarbodiimide, and/or a polyepoxide. Useful aminoplasts can for example be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®.

Suitable carbodiimide crosslinkers include an aliphatic and/or cycloaliphatic dinitrogen analogue of carbonic acid of the generalized structure: $RN=C=NR_1$ where R and $R_1$ are independently aliphatic or cycloaliphatic groups. The aliphatic groups can comprise 1-6 carbon atoms. Examples include dibutyl carbodiimide and dicyclohexyl carbodiimide. Oligomeric or polymeric carbodiimide crosslinkers can also be used. Examples of such materials are disclosed in United States Patent Application Publication Number 2009/0246393A1.

Examples of polyepoxides suitable as crosslinking agents include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including the polyglycidyl ethers of polyhydric phenols and alcohols described above, are also suitable as crosslinking agents.

The amount of the crosslinking agent in the binder (b) is generally at least 1 percent by weight, such as at least 2 percent by weight, or at least 3 percent by weight, based on the total weight of resin solids in the binder (b). The amount of the crosslinking agent in the binder (b) is typically up to 5 percent by weight, such as up to 4 percent by weight, based on the total weight of resin solids in the binder (b). The crosslinking agent, if present, may for example be used in an amount in the range from 1 to 5, or from 3 to 5, or from 2 to 4 percent by weight, based on the total weight of resin solids in the binder (b).

The binder (b) is typically essentially free of any polyvinylidene fluoride (PVDF) polymers.

The binder dispersed in the aqueous or organic medium may be used to bind the electrically active material (a) to a conductive substrate; e.g., an electrical current collector, such as a sheet or foil comprising aluminum or copper, in an electrode.

The binder can be present in the electrode slurry composition of the present invention in amounts of at least 0.1 percent by weight, such as at least 1 percent by weight, based on the total weight of solids in the slurry. The binder can be present in the electrode slurry composition of the present invention in amounts of up to 30 percent by weight, or up to 20 percent by weight, or up to 10 percent by weight, or up to 7 percent by weight, based on the total weight of solids in the slurry. The binder can for example be present in the electrode slurry composition of the present invention in an amount of 1 to 20 percent by weight, or 1 to 10 percent by weight, or 4 to 7 percent by weight, based on the total weight of solids in the slurry.

The electrode slurry further comprises (c) an electrically conductive agent. Examples of suitable conductive agents include carbonaceous materials, such as graphite, activated carbon, acetylene black, furnace black, carbon fibers, fullerene and mixtures or combinations of any of the aforementioned. A particular example is TIMCAL C-NERGY™ SUPER C65 conductive carbon, available from TIMCAL Ltd. The electrically conductive agent (c) is usually present in the slurry in amounts of at least 1 percent by weight, or 5 percent by weight, based on the total weight of solids in the slurry. The electrically conductive agent (c) is usually present in the slurry in amounts of up to 20 percent by weight, or up to 10 percent by weight, or up to 9 percent by weight, based on the total weight of solids in the slurry. The electrically conductive agent (c) can for example be present in the electrode slurry composition of the present invention in an amount of 1 to 20 percent by weight, or 5 to 10 percent by weight, or 5 to 9 percent by weight, based on the total weight of solids in the slurry.

The electrode slurry often further contains a thickener to prevent settling of the solids while providing appropriate slurry viscosity for coating a current collector. Examples of the thickener include cellulose and derivatives thereof such as carboxymethyl cellulose, methyl cellulose and hydroxypropyl cellulose; ammonium salts and alkali metal salts of the above cellulose derivatives; polycarboxylic acids such as poly(meth)acrylic acid and modified poly(meth)acrylic acid; alkali metal salts of the above polycarboxylic acids; polyvinyl alcohol-based (co)polymers such as polyvinyl alcohol, modified polyvinyl alcohol and ethylene-vinyl alcohol copolymer; water-soluble polymers such as saponified products of a copolymer of an unsaturated carboxylic acid such as (meth)acrylic acid, maleic acid or fumaric acid and a vinyl ester and anionic (meth)acrylic polymer thickeners.

Commercially available products of these thickeners include CMC1120, CMC1150, CMC2200, CMC2280 and CMC2450 (of Daicel Chemical Industries, Ltd.) as alkali metal salts of carboxymethyl cellulose and ACRYSOL ASE 60 and 75 anionic (meth)acrylic polymer thickeners from Dow Chemical Co.

The content of the thickener, if present in the electrode slurry composition, is usually at least 0.1 percent by weight, or 0.5 percent by weight, based on the total weight of solids in the electrode slurry. The thickener, if present, is usually used in an amount of up to 30 percent by weight, or up to 25 percent by weight, or up to 15 percent by weight, or up to 10 percent by weight, based on the total weight of solids in the electrode slurry. The optional thickener can for example be present in the electrode slurry composition of the present invention in an amount of 0.1 to 15 percent by weight, or 0.5 to 10 percent by weight, based on the total weight of solids in the electrode slurry.

In addition to water or solvent incorporated into the slurry as the medium of the binder (b), water and/or solvent may be added as a separate component of the slurry. For example, water or organic solvent may be present in the electrode slurry in an amount of at least 20 percent by weight, or at least 30 percent by weight, based on total weight of the slurry. Additionally, water or organic solvent may be present in the electrode slurry of the present invention in an amount of up to 80 percent by weight, or up to 70 percent by weight, or up to 60 percent by weight. The electrode slurry composition of the present invention can for example contain from 20 to 80 percent by weight, or from 20 to 70 percent by weight, or from 30 to 60 percent by weight, of water or organic solvent, based on total weight of the slurry.

When the binder (b) is in an aqueous dispersion, the electrode slurry may contain an organic solvent or diluent to improve the stability and coatability of the slurry. Examples of the organic solvent include alcohols such as 2-butoxyethanol; ketones such as methyl ethyl ketone, cyclohexanone, isophorone, acetophenone; phosphates such as triethyl phosphate, and ethers such as C1 to C4 alkyl and dialkyl ethers of ethylene and propylene glycol, or any of those listed above as a suitable medium of the binder (b). The solvent may be incorporated into the slurry as a component of the binder (b), and/or as a separate component of the slurry as noted above. When used with an aqueous dispersion, the organic solvent is typically present in amounts of at least 2 percent by weight, such as at least 10 percent by weight, based on total weight of the slurry. When used with an aqueous dispersion, the organic solvent is typically present in amounts of in an amount of up to 60 percent by weight, or up to 50 percent by weight, or up to 30 percent by weight, based on total weight of the slurry. For example the organic solvent may present in the electrode slurry composition of the present invention in an amount in the range from 2 to 50 percent by weight, or from 10 to 30 percent by weight, based on total weight of the slurry. As noted above, the slurry is usually essentially free of NMP.

The electrode slurry can be manufactured by mixing together the electrochemically active material (a), the binder (b), the electrically conductive agent (c), additional water and/or organic solvent if necessary, and optional additives such as those mentioned above, if any. These substances can be mixed together by agitation with a known means such as stirrer, bead mill or high-pressure homogenizer, such as is demonstrated in the Examples below.

A suitable mixer should be capable of stirring the slurry components to such an extent that a satisfactory dispersion is produced and agglomeration of the active material particles is prevented. The degree of dispersion can be measured with a particle gauge, and mixing and dispersion are usually carried out to ensure that agglomerates of 100 nanometers or more are not present. Examples of suitable mixers include ball mills, sand mills, pigment dispersers, grinding machines, ultrasonic dispersers, homogenizers, planetary mixers and Hobart mixers.

The present invention also provides an electrode comprising:
(a) an electrical current collector; and
(b) a cured film formed on the electrical current collector, wherein the film is deposited from any of the slurry compositions described above.

The current collector (a) is not particularly limited if it is made of a conductive material. In a lithium ion secondary battery, a current collector made of a metal such as iron, copper, aluminum, nickel or stainless steel can be used. Typically, aluminum or copper in sheet, foil, or mesh form is used.

Although the shape and thickness of the current collector are not particularly limited, the current collector is usually in the form of a sheet or foil having a thickness of about 0.001 to 0.5 mm.

Each of the components in the slurry composition used to form the film deposited on the electrical current collector may be selected from the components described earlier. The binder (b) may also further comprise any of the crosslinking agents described above.

The electrode can be manufactured by applying the above slurry to the surface of a suitable current collector to form a coating, and curing the coating by subjecting the coated current collector to conditions for a time sufficient to allow reactive components in the coating to react and form a hardened film.

The method of applying the slurry to the current collector is not particularly limited. The slurry may for example be applied by doctor blade coating, dip coating, reverse roll coating, direct roll coating, gravure coating, extrusion coating, immersion or brushing. Although the application quantity of the slurry is not particularly limited, the thickness of the active material layer formed after the liquid medium is removed is typically 25 to 150 microns (μm), such as 30 to 125 μm.

The method of curing or crosslinking the coating film after application can for example be done by heating at elevated temperature, such as 50 to 150° C., or 50 to 140° C. The time of heating will depend somewhat on the temperature. Generally, higher temperatures require less time for curing. Typically, curing times are for at least 10 minutes, such as 15 to 60 minutes. The extent of cure or crosslinking is typically measured as resistance to solvents such as methyl ethyl ketone (MEK). The test is performed as described in ASTM D-540293, published 1999. The number of double rubs, one back and forth motion, is reported. This test is often referred to as "MEK Resistance".

The present invention additionally provides an electrical storage device such as a battery, comprising: (a) the electrode described above; (b) a counter electrode; and (c) an electrolyte. The electrolyte (c) typically comprises a lithium salt, such as any of those listed above, dissolved in a solvent. Suitable solvents include organic carbonates such as ethylene carbonate, diethyl carbonate and dimethyl carbonate. Electrical storage devices of the present invention typically demonstrate an electrical capacity of at least 60 mAh/g, or at least 65 mAh/g, or at least 70 mAh/g, at 6.4 C discharge.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" reaction product, "an" electrically active material, "a" crosslinker, and the like, one or more of each of these and any other components can be used. As used herein, the term "polymer" refers to oligomers and both homopolymers and copolymers, and the prefix "poly" refers to two or more. The term "resin" is used interchangeably with "polymer". Including and like terms means including but not limited to. When ranges are given, any endpoints of those ranges and/or numbers within those ranges can be combined within the scope of the present invention.

Each of the characteristics and examples described above, and combinations thereof, may be said to be encompassed by the present invention. The present invention is thus drawn to the following nonlimiting aspects:

1. A lithium ion battery electrode slurry composition comprising:
   (a) an electrochemically active material capable of lithium intercalation and deintercalation;
   (b) a binder dispersed in an aqueous or organic medium and comprising a reaction product of a reaction mixture comprising one or more epoxy functional polymer(s) and one or more acid functional acrylic polymer(s); and
   (c) an electrically conductive agent.
2. The electrode slurry composition according to aspect 1, further comprising a thickener such as a carboxymethylcellulose.
3. The electrode slurry composition according to any of aspects 1 to 2, wherein the mixture of polymers comprises at least 70 percent by weight of one or more epoxy functional polymer(s) and up to 30 percent by weight of one or more acid functional acrylic polymer(s), wherein the percentages by weight are based on the total weight of the reaction product.
4. The electrode slurry composition according to any of aspects 1 to 3, wherein the binder (b) further comprises a crosslinking agent such as an aminoplast, a polycarbodiimide, a polyepoxide or a mixture or combination of any of the foregoing.
5. The electrode slurry composition according to any of aspects 1 to 4, wherein the electrochemically active material (a) comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, graphite, silicon compounds, tin, tin compounds, or a mixture or combination of any of the foregoing.
6. The electrode slurry composition according to any of aspects 1 to 5, wherein the electrically conductive agent (c) comprises graphite, acetylene black, furnace black, graphene or a mixture or combination of any of the foregoing.
7. The electrode slurry composition according to any of aspects 1 to 6, wherein the binder (b) is dispersed in an aqueous medium, and wherein the slurry further comprises an organic solvent.
8. The electrode slurry composition according to any of aspects 1 to 7, wherein the slurry is essentially free of N-Methyl-2-pyrrolidone and/or wherein the binder (b) is essentially free of a polyvinylidene fluoride polymer.
9. The electrode slurry composition according to any of aspects 1 to 8, wherein the electrochemically active material (a) is present in amounts of 70 to 98 percent by weight; the binder (b) is present in amounts of 1 to 10 percent by weight and the electrically conductive agent (c) is present in amounts of 1 to 20 percent by weight, the percentages by weight being based on the total weight of solids in the slurry.
10. An electrode comprising:
    (a) an electrical current collector; and
    (b) a cured film formed on the electrical current collector, wherein the film is deposited from the electrode slurry composition according to any of aspects 1 to 9.
11. The electrode according to aspect 10, wherein the electrical current collector (a) comprises copper or aluminum in the form of a mesh, sheet or foil.
12. An electrical storage device comprising:
    (a) the electrode according to any of aspects 10 or 11,
    (b) a counter electrode, and
    (c) an electrolyte.
13. The electrical storage device according to aspect 12, wherein the electrolyte (c) comprises a lithium salt dissolved in a solvent such as an organic carbonate.

EXAMPLES

Illustrating the invention are the following examples that are not to be construed as limiting the invention to their details. All parts in the Examples, as well as throughout the specification, are by weight unless otherwise indicated.

In the following Examples, Examples 1-3 each demonstrate the synthesis of an epoxy-functional acrylate polymer dispersed in an aqueous medium by chain extension using an acid functional acrylic polymer and an epoxy-functional polymer.

Examples 4-6 each demonstrate the synthesis of an aqueous binder.

Examples 7-9 each demonstrate the preparation of a lithium ion battery electrode slurry and the coating of an electrical current collector in accordance with the present invention.

Example 10 is a comparative example demonstrating the preparation of a solution of PVDF in NMP.

Example 11 is a comparative example demonstrating the preparation of a PVDF slurry and the coating of an electrical current collector with the PVDF slurry.

Example 1

An epoxy-functional acrylic polymer dispersed in an aqueous medium was prepared as described in the following three stages.

Stage 1—An acid functional acrylic polymer with a theoretical acid value of 103.6 was prepared as follows:

| | Ingredients | Amount (gram) |
|---|---|---|
| Charge 1: | Butyl ether of ethylene glycol | 542.0 |
| | BUTVAR B-98 - (Polyvinyl Butyral Resin, available from Electron Microscopy Sciences) | 101.2 |
| Charge 2: | Di-tertiary amyl peroxide | 13.8 |
| (premixed) | Butyl ether of ethylene glycol | 53.3 |
| Charge 3: | Ethyl acrylate | 401.3 |
| (premixed) | Styrene | 13.3 |
| | Methacrylic acid | 254.1 |
| Charge 4: | N-butanol | 64.1 |
| (premixed) | N-Amyl alcohol | 154.6 |

To a suitable reaction vessel equipped with a stirrer, reflux condenser, thermometer, heating mantle and nitrogen inlet, Charge 1 was added at ambient temperature. By "ambient" is meant without the application of heat or other energy; for example, when a mixture of monomers undergoes a polymerization reaction without applying heat to prompt the reaction, the reaction is said to occur under ambient conditions. Usually ambient temperature ranges from 60 to 90° F. (15.6 to 32.2° C.), such as a typical room temperature, 72° F. (22.2° C.).

The temperature was increased to reflux (~160° C.), at which time the catalyst premix of Charge 2 was added over 205 minutes. Five (5) minutes after the start of Charge 2, Charge 3 was added over 180 minutes. Upon completion of Charges 2 and 3, the reaction was held for additional 60 minutes at reflux (~160° C.). Thereafter the reaction temperature was cooled to 80° C. and Charge 4 was added with a subsequent 15 minute hold period. The polymeric product thus formed had a theoretical solids content of 49.1%.

Stage 2—An epoxy-functional polymer with an epoxy-equivalent weight in the range of 5500-6500 as measured by titration with 0.1 N perchloric acid according to ASTM D1652 was prepared as follows:

| | Ingredients | Amount (gram) |
|---|---|---|
| Charge 1: | EPON 828 polyepoxide | 620.0 |
| | Bisphenol A | 327.0 |
| | Xylene | 76.0 |
| | Ethyl triphenyl phosphonium iodide | 0.7 |
| Charge 2: | Ethyl ether of diethylene glycol | 538.0 |
| Charge 3: | Monoethanol amine | 6.6 |
| (premixed) | Ethyl ether of diethylene glycol | 5.6 |

To a suitable reaction vessel equipped with a stirrer, reflux condenser, thermometer, heating mantle and nitrogen inlet, Charge 1 was added at ambient temperature. The temperature was then increased to 110° C. and the reaction mixture was held at this temperature for 30 minutes. The temperature was then increased to 160° C. over 30 minutes to avoid excess exotherm, and set to 170° C. and held at this temperature till the epoxy equivalent weight was in the range of 2200-2450, as measured by titration with 0.1 N perchloric acid according to ASTM D1652. Then the reaction mixture was cooled to 125° C. and Charge 2 was added, followed by addition of Charge 3. The mixture was then held for 90 minutes. Measured epoxy equivalent weight was in the range of 5500 to 6500. The polymeric product thus formed had a theoretical solids content of 60.6%.

Stage 3—An epoxy-functional acrylic polymer dispersed in an aqueous medium was prepared from the acid functional acrylic polymer obtained from stage 1 and the epoxy-functional polymer obtained from stage 2 as follows:

|  | Ingredients | Amount (gram) |
|---|---|---|
| Charge 1: | Acid functional acrylic polymer from Stage 1 | 87.5 |
|  | Dimethylethanol amine | 2.5 |
|  | Ethyl ether of diethylene glycol | 7.3 |
| Charge 2: | Epoxy functional polymer from Stage 2 | 400.0 |
| Charge 3: (premixed) | Deionized water | 226.5 |

To a suitable reaction vessel equipped with a stirrer, reflux condenser, thermometer, heating mantle and nitrogen inlet, Charge 1 was added at ambient temperature. The temperature was then increased to 90° C. and then Charge 2 was added slowly so that the temperature did not exceed 105° C. The contents of the flask were held at this temperature for 60 minutes, followed by cooling to 70° C. Charge 3 was preheated to 70° C. and added over 60 minutes followed by a hold of 30 minutes. The polymeric product thus formed had a theoretical solids content of 41.5%.

Example 2

An epoxy-functional acrylic polymer dispersed in an aqueous medium was prepared as described in the following three stages:

Stage 1—An acid-functional acrylic polymer with a theoretical acid value of 103.6 was prepared as follows:

|  | Ingredients | Amount (gram) |
|---|---|---|
| Charge 1: | Butyl ether of ethylene glycol | 542.0 |
| Charge 2: (premixed) | Di-tertiary amyl peroxide | 13.8 |
|  | Butyl ether of ethylene glycol | 53.3 |
| Charge 3: (premixed) | Ethyl acrylate | 502.5 |
|  | Styrene | 13.3 |
|  | Methacrylic acid | 254.1 |
| Charge 4: (premixed) | N-butanol | 64.1 |
|  | N-Amyl alcohol | 154.6 |

To a suitable reaction vessel equipped with a stirrer, reflux condenser, thermometer, heating mantle and nitrogen inlet, Charge 1 was added at ambient temperature. The temperature was increased to reflux (~160° C.), at which time the catalyst premix of Charge 2 was added over 205 minutes. Five (5) minutes after the start of Charge 2, Charge 3 was added over 180 minutes. Upon completion of Charges 2 and 3, the reaction was held for additional 60 minutes at reflux (~160° C.). Thereafter the reaction temperature was cooled to 80° C. and Charge 4 was added with a subsequent 15-minute hold period. The polymeric product thus formed had a theoretical solids content of 49.1%.

Stage 2—An epoxy-functional polymer with an epoxy-equivalent weight in the range of 5500-6500 as measured by titration with 0.1 N perchloric acid according to ASTM D1652 was prepared as follows:

|  | Ingredients | Amount (gram) |
|---|---|---|
| Charge 1: | EPON 828 polyepoxide | 620.0 |
|  | Bisphenol A | 327.0 |
|  | Xylene | 76.0 |
|  | Ethyl triphenyl phosphonium iodide | 0.7 |
| Charge 2: | Ethyl ether of diethylene glycol | 538.0 |

-continued

|  | Ingredients | Amount (gram) |
|---|---|---|
| Charge 3: (premixed) | Monoethanol amine | 6.6 |
|  | Ethyl ether of diethylene glycol | 5.6 |

To a suitable reaction vessel equipped with a stirrer, reflux condenser, thermometer, heating mantle and nitrogen inlet, Charge 1 was added at ambient temperature. The temperature was then increased to 110° C. and the reaction mixture was held at this temperature for 30 minutes. The temperature was then increased to 160° C. over 30 minutes to avoid excess exotherm, and set to 170° C. and held at this temperature till the epoxy equivalent weight was in the range of 2200-2450 as measured by titration with 0.1 N perchloric acid according to ASTM D1652. Then the reaction mixture was cooled to 125° C. and Charge 2 was added, followed by addition of Charge 3 and the mixture was then held for 90 minutes. Measured epoxy equivalent weight was in the range of 5500 to 6500. The polymeric product thus formed had a theoretical solids content of 60.6%.

Stage 3—An epoxy-functional acrylic polymer dispersed in an aqueous medium was prepared from the acid functional acrylic polymer obtained from stage 1 and the epoxy-functional polymer obtained from stage 2 as follows:

|  | Ingredients | Amount (gram) |
|---|---|---|
| Charge 1: | Acid functional acrylic polymer from Stage 1 | 87.5 |
|  | Dimethylethanol amine | 3.1 |
|  | Ethyl ether of diethylene glycol | 2.5 |
| Charge 2: | Epoxy functional polymer from Stage 2 | 270.0 |
| Charge 3: | Dimethyl ethanol amine | 4.2 |
| Charge 4: | Deionized water | 136.0 |
| Charge 5: | Epoxy-functional polymer of Stage 2 | 134.0 |
| Charge 6: | Deionized water | 32.0 |

To a suitable reaction vessel equipped with a stirrer, reflux condenser, thermometer, heating mantle and nitrogen inlet, Charge 1 was added at ambient temperature. The temperature was then increased to 90° C. and then Charge 2 was added slowly so that the temperature did not exceed 105° C. The contents of the flask were held at this temperature for 60 minutes, followed by cooling to 90° C. Charge 3 was added followed by the addition of Charge 4 over 30 minutes. The reaction solution was held at 90° C. for 15 minutes, followed by the addition of Charge 5 over 15 minutes. After holding the solution for 15 minutes, Charge 6 was added. The polymeric product thus formed had a theoretical solids content of 41.5%.

Example 3

An epoxy-functional acrylic polymer dispersed in an aqueous medium was prepared as described in the following three stages:

Stage 1—An acid-functional acrylic polymer with a theoretical acid value of 103.6 was prepared as follows:

|  | Ingredients | Amount (gram) |
|---|---|---|
| Charge 1: | Butyl ether of ethylene glycol | 542.0 |
|  | BUTVAR B-98 - (Polyvinyl Butyral Resin) | 101.2 |
| Charge 2: (premixed) | Di-tertiary amyl peroxide | 13.8 |
|  | Butyl ether of ethylene glycol | 53.3 |

-continued

| | Ingredients | Amount (gram) |
|---|---|---|
| Charge 3: (premixed) | Ethyl acrylate | 401.3 |
| | Styrene | 13.3 |
| | Methacrylic acid | 254.1 |
| Charge 4: (premixed) | N-butanol | 64.1 |
| | N-Amyl alcohol | 154.6 |

To a suitable reaction vessel equipped with a stirrer, reflux condenser, thermometer, heating mantle and nitrogen inlet, Charge 1 was added at ambient temperature. The temperature was increased to reflux (~160° C.), at which time the catalyst premix of Charge 2 was added over 205 minutes. Five (5) minutes after the start of Charge 2, Charge 3 was added over 180 minutes. Upon completion of Charges 2 and 3, the reaction was held for additional 60 minutes at reflux (~160° C.). Thereafter the reaction temperature was cooled to 80° C. and Charge 4 was added with a subsequent 15-minute hold period. The polymeric product thus formed had a theoretical solids content of 49.1%.

Stage 2—An epoxy-functional polymer with an epoxy-equivalent weight in the range of 9000-11000 as measured by titration with 0.1 N perchloric acid according to ASTM D1652 was prepared as follows:

| | Ingredients | Amount (gram) |
|---|---|---|
| Charge 1: | EPON 828 polyepoxide | 620.0 |
| | Bisphenol A | 327.0 |
| | Xylene | 76.0 |
| | Ethyl triphenyl phosphonium iodide | 0.7 |
| Charge 2: | Ethyl ether of diethylene glycol | 538.0 |
| Charge 3: (premixed) | Monoethanol amine | 9.1 |
| | Ethyl ether of diethylene glycol | 5.6 |

To a suitable reaction vessel equipped with a stirrer, reflux condenser, thermometer, heating mantle and nitrogen inlet, Charge 1 was added at ambient temperature. The temperature was then increased to 110° C. and the reaction mixture was held at this temperature for 30 minutes. The temperature was then increased to 160° C. over 30 minutes to avoid excess exotherm, and set to 170° C. and held at this temperature till the epoxy equivalent weight as measured by titration with 0.1 N perchloric acid according to ASTM D1652 was in the range of 2200-2450. Then the reaction mixture was cooled to 125° C. and Charge 2 was added, followed by addition of Charge 3 and held for 90 minutes. Measured epoxy equivalent weight was in the range of 9000 to 11000. The polymeric product thus formed had a theoretical solids content of 60.6%.

Stage 3—An epoxy-functional acrylic polymer dispersed in an aqueous medium was prepared from the acid functional acrylic polymer obtained from stage 1 and the epoxy-functional polymer obtained from stage 2 as follows:

| | Ingredients | Amount (gram) |
|---|---|---|
| Charge 1: | Acid functional acrylic polymer from Stage 1 | 87.5 |
| | Dimethylethanol amine | 3.1 |
| | Ethyl ether of diethylene glycol | 2.5 |
| Charge 2: | Epoxy functional polymer from Stage 2 | 270.0 |
| Charge 3: | Dimethyl ethanol amine | 4.2 |
| Charge 4: | Deionized water | 136.0 |
| Charge 5: | Epoxy-functional polymer of Stage 2 | 134.0 |
| Charge 6: | Deionized water | 32.0 |

To a suitable reaction vessel equipped with a stirrer, reflux condenser, thermometer, heating mantle and nitrogen inlet, Charge 1 was added at ambient temperature. The temperature was then increased to 90° C. and then Charge 2 was added slowly so that the temperature did not exceed 105° C. The contents of the flask were held at this temperature for 60 minutes, followed by cooling to 90° C. Charge 3 was added followed by the addition of Charge 4 over 30 minutes. The reaction solution was held at 90° C. for 15 minutes, followed by the addition of Charge 5 over 15 minutes. After holding the solution for 15 minutes, Charge 6 was added. The polymeric product thus formed had a theoretical solids content of 41.5%.

Example 4

To a plastic container was added phenol-formaldehyde resin, HRJ-13078 (available from Si Group, 1.3 grams), methylated benzoguanamine-formaldehyde resin, MAPRENAL MF 984/80B (available from Ineos Melamines, 0.6 grams), and the epoxy-functional acrylic polymer dispersed in an aqueous medium (112.5 grams) from Stage 3 of Example 1. This blend was then placed in a dual-asymmetric centrifugal mixer and mixed at 2350 rpm for 5 minutes.

Example 5

To a plastic container was added phenol-formaldehyde resin, HRJ-13078 (available from Si Group, 1.3 grams), methylated benzoguanamine-formaldehyde resin, MAPRENAL MF 984/80B (available from Ineos Melamines, 0.6 grams), and the epoxy-functional acrylic polymer dispersed in an aqueous medium (112.5 grams) from Stage 3 of Example 2. This blend was then placed in a dual-asymmetric centrifugal mixer and mixed at 2350 rpm for 5 minutes.

Example 6

To a plastic container was added phenol-formaldehyde resin, HRJ-13078 (available from Si Group, 1.3 grams), methylated benzoguanamine-formaldehyde resin, MAPRENAL MF 984/80B (available from Ineos Melamines, 0.6 grams), and the epoxy-functional acrylic polymer dispersed in an aqueous medium (112.5 grams) from Stage 3 of Example 3. This blend was then placed in a dual-asymmetric centrifugal mixer and mixed at 2350 rpm for 5 minutes.

Example 7

To a small plastic mixing cup was added 1.9 grams of ethanol, 19 grams of deionized water, and 0.2 grams of sodium carboxymethylcellulose. After mixing to achieve a clear solution, 0.7 grams of TIMCAL C-NERGY™ SUPER C65 conductive carbon (available from TIMCAL) was added. This blend was placed in a dual-asymmetric centrifugal mixer and mixed at 2000 rpm for 5 minutes. Cathode active powder lithium ion phosphate (LFP) (LIFE POWER P2 lot #1110GY195 available from Phostech Lithium, Inc) (7.9 grams) was added to this mixed blend, and the resulting combination was subjected to a second mixing in a dual asymmetric centrifugal mixer at 2000 rpm for 5 minutes. Next, 1.5 grams of the aqueous binder from Example 4 was added and the combination was subjected to a third mixing in a dual-asymmetric centrifugal mixer at 2000 rpm for 5 minutes. And finally, 3.6 grams of 2-butoxyethanol solvent was added and the mixture was mixed in a dual-asymmetric centrifugal mixer at 2000 rpm for 5 minutes for the final time.

A wet film was prepared on pre-cleaned aluminum foil (foil of aluminum alloy 1085 from Targray pre-cleaned with acetone) by a draw-down application of this formulated slurry using an automatic film coater (MSK-AFA-II from MTI Corporation) using an adjustable doctor blade at a rate of 89 mm/sec. This wet film was heated in an oven to a maximum temperature of 140° C. for at least 10 minutes. After cooling, an average dry film thickness of 53 microns was determined from five measurements with a micrometer.

Example 8

To a small plastic cup was added 2.2 grams of ethanol, 22.4 grams of deionized water, and 0.2 grams of sodium carboxymethylcellulose. After mixing to a clear solution, 0.8 grams of TIMCAL C-NERGY™ SUPER C65 conductive carbon was added. This blend was placed in a dual-asymmetric centrifugal mixer and mixed at 2000 rpm for 5 minutes. Cathode active powder lithium ion phosphate (LFP) (LIFE POWER P2 lot #1110GY195 available from Phostech Lithium, Inc) (7.9 grams) was added to this mixed blend, and the resulting combination was subjected to a second mixing in a dual asymmetric centrifugal mixer at 2000 rpm for 5 minutes. Next, 1.5 grams of the aqueous binder from Example 5 was added and the combination was subjected to a third mixing in a dual-asymmetric centrifugal mixer at 2000 rpm for 5 minutes. And finally, 3.6 grams of 2-butoxyethanol solvent was added and the mixture was mixed in a dual-asymmetric centrifugal mixer at 2000 rpm for 5 minutes for the final time.

A wet film was prepared on pre-cleaned aluminum foil (foil of aluminum alloy 1085 from Targray pre-cleaned with acetone) by a draw-down application of this formulated slurry using an automatic film coater (MSK-AFA-II from MTI Corporation) using an adjustable doctor blade at a rate of 89 mm/sec. This wet film was heated in an oven to a maximum temperature of 140° C. for at least 10 minutes. After cooling, an average dry film thickness of 53 microns was determined from five measurements with a micrometer.

Example 9

To a small plastic mixing cup was added 2.2 grams of ethanol, 22.4 grams of deionized water, and 0.2 grams of sodium carboxymethylcellulose. After mixing to a clear solution, 0.8 grams of TIMCAL C-NERGY™ SUPER C65 conductive carbon was added. This blend was placed in a dual-asymmetric centrifugal mixer and mixed at 2000 rpm for 5 minutes. Cathode active powder lithium ion phosphate (LFP) (LIFE POWER P2 lot #1110GY195 available from Phostech Lithium, Inc) (9.1 grams) was added to this mixed blend, and the resulting combination was subjected to a second mixing in a dual asymmetric centrifugal mixer at 2000 rpm for 5 minutes. Next, 1.6 grams of the aqueous binder from Example 6 was added and the combination was subjected to a third mixing in a dual-asymmetric centrifugal mixer at 2000 rpm for 5 minutes. And finally, 4.4 grams of 2-butoxyethanol solvent was added and the mixture was mixed in a dual-asymmetric centrifugal mixer at 2000 rpm for 5 minutes for the final time.

A wet film was prepared on pre-cleaned aluminum foil (foil of aluminum alloy 1085 from Targray pre-cleaned with acetone) by a draw-down application of this formulated slurry using an automatic film coater (MSK-AFA-II from MTI Corporation) using an adjustable doctor blade at a rate of 89 mm/sec. This wet film was heated in an oven to a maximum temperature of 140° C. for at least 10 minutes. After cooling, an average dry film thickness of 58 microns was determined from five measurements with a micrometer.

Example 10 (Comparative)

To a plastic container was added solvent grade N-methyl-2-pyrrolidone (available from Ashland, 570.7 grams). While stirring with a Cowles blade, polyvinylidene difluoride, KYNAR HSV 900 PVDF (available from Arkema, 29.3 grams) was added in portions. Stirring was continued until the polymer was completely dissolved.

Example 11 (Comparative)

To a plastic cup was added N-methyl-2-pyrrolidone (15.7 grams), the binder solution from Example 10 (27.66 grams) and 1.35 grams of TIMCAL C-NERGY™ SUPER C65 conductive carbon. This blend was placed in a dual-asymmetric centrifugal mixer and mixed at 2350 rpm for 5 minutes. Cathode active powder lithium ion phosphate (LFP) (LIFE POWER P2 lot #1110GY195 available from Phostech Lithium, Inc) (15.3 grams) was added to this mixed blend, and the resulting combination was subjected to a second mixing in a dual-asymmetric centrifugal mixer at 2350 rpm for 5 minutes to produce formulated slurry.

A wet film was prepared on pre-cleaned aluminum foil (foil of aluminum alloy 1085 from Targray pre-cleaned with acetone) by a draw-down application of this formulated slurry using an automatic film coater (MSK-AFA-II from MTI Corporation) using an adjustable doctor blade at a rate of 89 mm/sec. This wet film was heated in an oven to a maximum temperature of 120° C. for at least 10 minutes. After cooling, an average dry film thickness of 44 microns was determined from five measurements with a micrometer.

The dual-asymmetric centrifugal mixer that was used in the examples above was a model DAC 400.1 FVZ from FlackTec, Inc. or model ARM-310 Thinky USA, Inc.

The dry coated foils obtained from Examples 7 to 9 and Comparative Example 11 were studied for their electrochemical performance as battery electrode. For this purpose the dry coated foils were passed through a roll calendar press (MTI Corporation) to achieve 25-30% compression. After vacuum drying, two coin-type half-cell batteries per dry coated foil were assembled using lithium metal as the anode and one-molar $LiPF_6$ in ethylene carbonate, diethyl carbonate and dimethyl carbonate solvents as the electrolyte. The coin cell batteries were then tested on a battery tester (Arbin Instruments) using a potential window of 4.1-2.5 Volts for 5 cycles each at currents corresponding to 0.2 C, 0.4 C, 0.8 C, 1.6 C, 3.2 C and 6.4 C charge/discharge rates, followed by 25 cycles at the current corresponding to a 1 C rate. Discharge capacity in milliamp-hours per gram of lithium iron phosphate was calculated from the average of the first 5 cycles for each C-rate. Discharge capacity averages from the higher capacity coin-type half-cell of the two replicate cells for a given dry coated foil are reported in Table 1. Capacity retention was calculated from the quotient of the discharge capacity after the first charge-discharge cycle at 1 C and the last charge-discharge cycle at 1 C and reported as percentage according to the equation: 100× first cycle capacity/last cycle capacity.

Note that "C-rate" refers to a current value that is required to fully discharge a cell having a constant electrical capacitance in a time period equal to the inverse of the C-rate values in hours. For example, discharge capacity at 0.2 C refers to dry coated film capacity in millamp-hours per gram of lithium iron phosphate at a current value required to fully discharge the battery in 5 hours. Similarly discharge capacity at 1 C refers to dry coated film capacity in milliamp-hours per gram of lithium iron phosphate at a current value required to fully discharge the battery in 1 hour.

The performance data measured as set forth above at 25° C. for the coin-cell batteries prepared from the dry coated aluminum foils obtained from Examples 7 to 9 and Comparative Example 11 are summarized in Table 1.

TABLE 1

Discharge data at 25° C. for coin-cell batteries prepared from Examples. Table 1 shows cell specific capacity (milliamp-hours per gram) for various discharge C-rates (per hour).

| Example | Discharge C-Rate (hour$^{-1}$) | | | | | | | % Capacity Retention after about 25 cycles at C-rate of 1.0 |
|---|---|---|---|---|---|---|---|---|
|  | 0.2 | 0.4 | 0.8 | 1.6 | 3.2 | 6.4 | 1.0 |  |
| 7 | 145 |  |  | 117 |  | 72 | 127 | 91 |
| 8 | 143 |  |  | 114 |  | 69 | 124 | 91 |
| 9 | 139 |  |  | 111 |  | 71 | 120 | 91 |
| 11 (COMPARATIVE) | 158 | 156 | 151 | 140 | 116 | 66 | 146 | 93 |

As shown in table 1, batteries prepared with the slurries of the present invention compared to a battery prepared from a conventional NMP-based slurry (Comparative Example 11) demonstrate: (1) 90% of the control capacity for the 5-hour discharge (0.2 C rate); (2) capacity equivalent to or better than that of a conventional NMP-based slurry (Comparative Example 11) for the 0.156 hr discharge (6.4 C rate) and (3) equivalent cycle life (capacity retention after 25 cycles at 1 C rate).

Example 12

Nonlinear Stabilizer Acrylic 1 was prepared as follows:

| Ingredients | Parts by weight |
|---|---|
| Charge #1 | |
| Butyl Acetate | 877.6 |
| Charge #2 | |
| LUPEROX 270[1] | 32.2 |
| Butyl Acetate | 247.8 |
| Charge #3 | |
| Butyl Acrylate | 123.9 |
| Butyl Methacrylate | 247.8 |
| 2-Ethylhexyl Acrylate | 722.8 |
| Styrene | 123.9 |
| Glycidyl Methacrylate | 826.0 |
| Allyl Methacrylate | 20.7 |
| Charge #4 | |
| Butyl Acetate | 41.3 |
| Charge #5 | |
| LUPEROX 270 | 10.7 |
| Butyl Acetate | 26.9 |
| Charge #6 | |
| Butyl Acetate | 98.4 |

[1]LUPEROX 270 is t-butyl-per-3,5,5-trimethylhexanoate, available from Arkema, Inc.

Charge #1 was added into a 5-liter, 4-necked flask equipped with a motor-driven steel stir blade, a thermocouple, a nitrogen inlet, and a water-cooled condenser. The reaction mixture was heated to reflux (approximately 125° C.), by a mantle controlled by the thermocouple via a temperature feedback control device. Charge #2 and #3 were added dropwise via addition funnels over 3 hours, while the reaction mixture continued to reflux. After the addition was complete, the addition funnel that had contained Charge #3 was rinsed with Charge #4 into the reaction flask, and the reaction mixture was held at reflux for 60 minutes. Charge #5 was added over 30 minutes. After the addition was complete, the additional funnel that contained Charge #5 was rinsed with Charge #6 into the reaction flask, and the reaction mixture was held at reflux for 1 hour. The acrylic polymer solution thus obtained has a theoretical epoxy equivalent weight of 570 g/equivalent, an approximate Mw 33,600 and an approximate Mn 5,400 (measured by gel permeation chromatography using polystyrene standards) with a measured 110° C. solids of 61%.

Example 13

An epoxy functional resin was prepared as follows:

| Ingredients | Parts by weight |
|---|---|
| Charge #1 | |
| Acrylic from Example 12 | 390.6 |
| Solvent Blend A[2] | 250.6 |
| Charge #2 | |
| LUPEROX 270 | 0.40 |
| Solvent Blend A | 4.0 |
| Charge #3 | |
| Ethylene Glycol Dimethacrylate | 6.4 |
| Glycidyl Methacrylate | 16.0 |
| Styrene | 25.6 |
| Butyl Acrylate | 32.0 |
| Methyl Methacrylate | 80.0 |
| Charge #4 | |
| LUPEROX 270 | 2.60 |
| Solvent Blend A | 48.6 |
| Charge #5 | |
| Solvent Blend A | 16.0 |
| Charge #6 | |
| LUPEROX 270 | 2.0 |
| Solvent Blend A | 10.8 |
| Charge #7 | |
| Solvent Blend A | 6.41 |

[2]Solvent Blend A was 49% butyl acetate, and 51% ISOPAR E (isoparaffinic hydrocarbon solvent, available from ExxonMobil Chemical Company).

Charge #1 was added into a 2-liter, 4-necked flask equipped with a motor-driven steel stir blade, a thermocouple, a nitrogen inlet, and a water-cooled condenser. The reaction mixture was heated to reflux (approximately 120° C.), by a mantle controlled by the thermocouple via a temperature feedback control device. Charge #2 and 10.0% by weight of Charge #3 were added dropwise via addition funnels over 10 minutes, and then the reaction mixture was held at reflux for 30 minutes. After the hold, Charge #4 and the remainder of Charge #3 were added over 2 hours, while the reaction mixture continued at reflux. After the addition was complete, the addition funnel that contained Charge #3 was rinsed with Charge #5 into the reaction flask, and the reaction mixture was held at reflux for 60 minutes. Charge #6 was added over 30 minutes, and then the addition funnel that had contained Charge #6 was rinsed with Charge #7 into the reaction flask. The reaction mixture was held at reflux for 1 hour. The reaction product thus obtained had a clear, solution like appearance and a measured 110° C. solids content of 45%.

Example 14

| Ingredients | Parts by weight |
|---|---|
| Charge #1 | |
| Glycerin | 26.5 |
| Propanediol* | 2454.5 |
| Methyl Isobutyl Ketone (MIBK) | 421.8 |
| Ionol | 13.5 |
| Butyl Stannoic Acid | 11.2 |
| Triisodecyl Phosphite | 28.2 |
| Itaconic Acid** | 2798.7 |
| MODAFLOW in 50% MIBK*** | 0.36 |

*available from E. I. Dupont de Nemours.
**available from Supreme Resources
***available from Allnex. Used as a solution (50%) in methyl isobutyl ketone Charge #1 was added to a 12 liter 4-necked flask equipped with a motor-driven steel stir blade, a thermocouple, a nitrogen inlet, and Dean-Stark trap for azeotropic distillation. The reaction mixture was heated to 190° C., by a mantle controlled by the thermocouple via a temperature feedback control device. The heating continued until the acid value measured less than 15, measured as per ASTM D974 (2014). After the acid value reached <15, reaction heat was set to 120° C. and the Dean-Stark trap changed to a distillation set up to vacuum distill remaining MIBK. The resulting polyester was stable in 110° C. for a month. The resulting polymer solution thus obtained has an average Mw 1109 and an approximate Mn 593 (measured by gel permeation chromatography using polystyrene standards), 246 hydroxyl value and 110° C./1 hour solids of 94%.

Stage 2—Isocyanate Acrylate:

| Ingredients | Parts by weight |
|---|---|
| Charge #1 | |
| Isophorone Diisocyanate | 3362.5 |
| Ionol | 2.7 |
| Dibutyltin Dilaurate | 2.7 |
| Charge #2 | |
| 2-Hydroxyethyl Acrylate | 2000 |

Charge #1 was added to a 12 liter 4-necked flask equipped with a motor-driven steel stir blade, a thermocouple and a water-cooled condenser. Charge #2 was added dropwise via addition funnel over 4-5 hours, maintaining the reaction temperature below 50° C. After the addition the reaction mixture was held at 50° C. for 1 hour. The resulting clear solution isocyanate equivalent weight was 410 g/eq.

Stage 3—Polyester-Urethane-Acrylate

| Ingredients | Parts by weight |
|---|---|
| Charge #1 | |
| Stage 2 - Isocyanate Acrylate | 3689.5 |
| Ionol | 3.5 |
| Charge #2 | |
| Stage 1 - Polyester Polyol | 2150.54 |
| Charge #3 | |
| n-Butyl Acetate | 855.7 |

Charge #1 was added to a 12 liter 4-necked flask equipped with a motor-driven steel stir blade, a thermocouple and a water-cooled condenser. Charge #2 was added dropwise via addition funnel over 1 hour while maintaining the reaction temperature below 60° C. After the addition the reaction mixture was held at 80° C. for 30 minutes until the isocyanate signal disappeared by Infrared Spectroscopy scanning. After all isocyanate was consumed, Charge #3 was added and cooled to room temperature. The resulting polymer solution thus obtained had an average Mw 1670 and an approximate Mn 1,012 (measured by gel permeation chromatography using polystyrene standards) with a measured 110° C./1 hour solids of 85%.

Example 15

A solventborne reaction product of a reaction mixture comprising an epoxy functional polymer and an acid functional acrylic polymer was prepared as follows:

| | |
|---|---|
| Solvent | 0.2 g |
| Catalyst (methyl dicocoamine) | 0.7 g |
| Non aqueous epoxy dispersion of Example 13 | 80 g |
| Polyester-urethane acrylic polymer of Example 14 | 28 g |
| OXSOL 66 (cut) Anti-gassing agent | 0.2 g |
| Melamine (RESIMENE 741) | 2 g |
| Catalyst - phenyl acid phosphate | 0.6 g |
| DYNO ADD F1 Leveling agent | 0.1 g |
| RK-5345 Leveling agent (polybutylacrylate) | 0.2 g |
| Ethyl,3-ethoxypropionate | 35 g |

OXSOL 66 is a proprietary cut of solvents available from IsleChem on New York, N.Y. 10016
RESIMENE 741: Melamine formaldehyde resin available from INEOS of Frankfurt Germany D60386
DYNO ADD F1 is a proprietary mix of leveling agents available from Dynea in Lillestrom, Norway
RK-5345 is a polybutyl acrylate in xylene solvent available from E. I. Dupont de Nemours All the ingredients were added to a glass beaker in the order listed above under mild agitation. The entire mixture was stirred an additional 10 minutes with no precautions for air entrainment, temperature regulation or solvent evaporation.

Example 16

A solution was made using M-Pyrol (19.67 grams) and the reaction product of Example 15 (3.58 grams). To a plastic cup was added a portion of this binder solution (15.5 grams), conductive carbon TIMCAL SUPER C65 (1.0 grams), and cathode active powder lithium nickel cobalt manganate (UMICORE CELLCORE TX/60448, 18 grams). The resulting combination was subjected to a mixing in a dual-asymmetric centrifugal mixer at 2350 rpm for 3 minutes to produce a formulated slurry.

A wet film was prepared on pre-cleaned aluminum foil by a draw-down application (320 micron gap) of this formulated slurry using a doctor blade. This wet film was heated in an oven to a maximum temperature of 140° C. for at 30 minutes. After cooling, an average dry film thickness of 108 microns was determined from five measurements with a micrometer.

Battery performance data for this coating is shown in following table:

| Capacity (mAh/g) | | | | |
| --- | --- | --- | --- | --- |
| 0.1 C | 0.2 C | 0.5 C | 1 C | 2 C |
| 164 | 159 | 148 | 138 | 115 |

Whereas particular embodiments of this invention have been described above for purpose of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A lithium ion battery electrode slurry composition comprising:
   (a) an electrochemically active lithium compound capable of lithium intercalation and deintercalation;
   (b) a binder dispersed in an aqueous medium and comprising a reaction product of a reaction mixture comprising one or more epoxy functional polymer(s) and one or more acid functional acrylic polymer(s), wherein the reaction product comprises at least 70% by weight of one or more epoxy functional polymer(s) and up to 30% by weight of the one or more acid functional acrylic polymer(s), wherein the percentages by weight are based on the total weight of the reaction product; and
   (c) an electrically conductive agent,
   wherein the lithium ion battery electrode slurry composition is a lithium ion battery positive electrode slurry composition.

2. The electrode slurry composition of claim 1, further comprising a thickener.

3. The electrode slurry composition of claim 1, further comprising an organic solvent.

4. The electrode slurry composition of claim 1, wherein the electrochemically active lithium compound (a) comprises $LiCoO_2$, $LiNiO_2$, $LiFePO_4$, $LiCoPO_4$, $LiMnO_2$, $LiMn_2O_4$, $Li(NiMnCo)O_2$, $Li(NiCoAl)O_2$, carbon-coated $LiFePO_4$, or a mixture or combination of any of the foregoing.

5. The electrode slurry composition of claim 1, wherein the electrically conductive agent (c) comprises graphite, acetylene black, furnace black, graphene or a mixture or combination of any of the foregoing.

6. The electrode slurry composition of claim 1, wherein the slurry is essentially free of N-methyl-2-pyrrolidone.

7. The electrode slurry composition of claim 1, wherein the electrochemically active lithium compound (a) is present in amounts of 70 to 98 percent by weight; the binder (b) is present in amounts of 1 to 10 percent by weight and the electrically conductive agent (c) is present in amounts of 1 to 20 percent by weight, the percentages by weight being based on the total weight of solids in the slurry.

8. The electrode slurry composition of claim 1, wherein the binder (b) is essentially free of a polyvinylidene fluoride polymer.

9. The electrode slurry composition of claim 1, wherein the epoxy functional polymer has an epoxy equivalent weight of 3500-11000.

10. The electrode slurry composition of claim 1, wherein the acid functional acrylic polymer has a calculated acid value in the range of 20-150.

11. The electrode slurry composition of claim 1, wherein the binder (b) further comprises a crosslinking agent.

12. The electrode slurry composition of claim 11, wherein the crosslinking agent comprises an aminoplast, a polycarbodiimide, a polyepoxide or a mixture or combination of any of the foregoing.

13. An electrode comprising:
   (a) an electrical current collector; and
   (b) a cured film formed on the electrical current collector, wherein the film is deposited from a slurry composition compromising:
      (i) an electrochemically active lithium compound capable of lithium intercalation and deintercalation;
      (ii) a binder dispersed in an aqueous medium and comprising a reaction product of a reaction mixture comprising one or more epoxy functional polymer(s) and one or more acid functional acrylic polymer(s), wherein the reaction product comprises at least 70% by weight of one or more epoxy functional polymer(s) and up to 30% by weight of the one or more acid functional acrylic polymer(s), based on the total weight of the reaction product; and
      (iii) an electrically conductive agent,
   wherein the electrode is a positive electrode.

14. The electrode of claim 13, wherein the electrical current collector (a) comprises copper or aluminum in the form of a mesh, sheet or foil.

15. The electrode of claim 13, wherein the electrically conductive agent (iii) comprises graphite, acetylene black, furnace black, graphene or a mixture or combination of any of the foregoing.

16. The electrode of claim 13, wherein the slurry composition further comprises a thickener.

17. The electrode of claim 16, wherein the thickener comprises a carboxymethylcellulose.

18. An electrical storage device comprising:
   (a) the electrode of claim 13,
   (b) a counter electrode, and
   (c) an electrolyte.

19. The electrical storage device of claim 18, wherein the electrolyte (c) comprises a lithium salt dissolved in a solvent.

20. The electrical storage device of claim 19, wherein the lithium salt is dissolved in an organic carbonate.

* * * * *